(12) United States Patent
Singarayan et al.

(10) Patent No.: US 10,148,566 B2
(45) Date of Patent: Dec. 4, 2018

(54) SPLIT-HORIZON PACKET FORWARDING IN A MULTI-HOME PBB-EVPN NETWORK

(71) Applicant: Juniper Networks, Inc., Sunnyvale, CA (US)

(72) Inventors: Babu Singarayan, San Jose, CA (US); Tapraj Singh, San Ramon, CA (US); Vikas Vidyalal Patel, San Jose, CA (US); Swamy Sadashivaiah Renu Kananda, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 74 days.

(21) Appl. No.: 15/055,061

(22) Filed: Feb. 26, 2016

(65) Prior Publication Data
US 2017/0250904 A1    Aug. 31, 2017

(51) Int. Cl.
*H04L 12/721* (2013.01)
*H04L 12/46* (2006.01)
*H04L 12/707* (2013.01)

(52) U.S. Cl.
CPC .......... *H04L 45/66* (2013.01); *H04L 12/4641* (2013.01); *H04L 45/22* (2013.01)

(58) Field of Classification Search
CPC .................................................. H04L 12/4641
See application file for complete search history.

(56) References Cited

U.S. PATENT DOCUMENTS

| 7,184,437 | B1 | 2/2007 | Cole et al. |
| 8,953,590 | B1 | 2/2015 | Aggarwal et al. |
| 2011/0286452 | A1 | 11/2011 | Balus et al. |
| 2013/0230049 | A1* | 9/2013 | Zeng ..................... H04L 45/745 370/392 |

(Continued)

FOREIGN PATENT DOCUMENTS

EP    2928114 A1    10/2015

OTHER PUBLICATIONS

Sajassi et al., "Provider Backbone Bridging Combined with Ethernet VPN (PBB-EVPN)," Internet Engineering Task Force (IETF), Sep. 2015, 23 pp.

(Continued)

*Primary Examiner* — Sulaiman Nooristany
(74) *Attorney, Agent, or Firm* — Shumaker & Sieffert, P.A.

(57) ABSTRACT

Techniques are described to provide split-horizon packet forwarding so as to ensure that packets from the customer network that are injected into the provider backbone bridging Ethernet Virtual Private Network (PBB-EVPN) by one of the provider edge (PE) devices of the multi-homed Ethernet segment are not forwarded back toward the customer network by a different PE device connected to the same multi-homed Ethernet segment. For example, a method may comprise receiving a packet via a core-facing interface of a first PE device, determining the Ethernet segment associated with the PE devices by a lookup operation based on keys of the packet; in response to determining (Continued)

the Ethernet segment, supplanting the core-facing interface of the first PE device with a virtual interface associated with the keys, and forwarding the packet to a second CE device without forwarding the received packet back to the Ethernet segment associated with the first PE device.

16 Claims, 4 Drawing Sheets

(56) References Cited

U.S. PATENT DOCUMENTS

2016/0378606 A1* 12/2016 Sajassi ............... G06F 11/1423
714/4.2
2017/0141963 A1* 5/2017 Chalapathy ............. H04L 41/12

OTHER PUBLICATIONS

Extended Search Report from counterpart European Application No. 17157970.9, dated Apr. 28, 2016, 6 pp.
Sajassi et al., "BGP-MPLS-Based Ethernet VPN," RFC 7432, Internet Engineering Task Force (IETF), Feb. 2015, 56 pp.
Sajassi et al., "Provider Backbone Bridging Combined With Ethernet VPN (PBB-EVPN)," Internet Working Group, Internet Draft, May 14, 2015, 22 pp.
"Provider Backbone Bridges," IEEE 802.1ah, Aug. 14, 2008, pp. 1-110.
Response to Extended Search Report dated Apr. 28, 2017, from counterpart European Application No. 17157970.9, filed Feb. 28, 2018, 4 pp.
Intent to Grant dated Apr. 5, 2018, from counterpart European Application No. 17157970.9, 37 pp.

\* cited by examiner

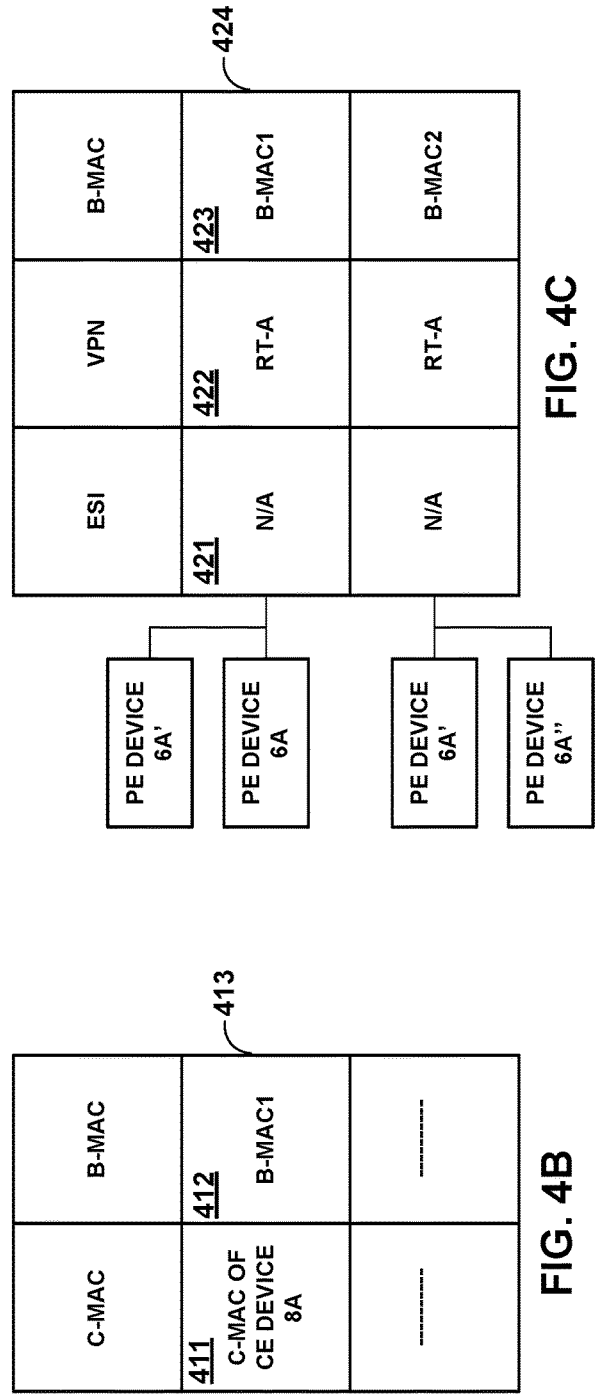

SPLIT-HORIZON PACKET FORWARDING IN A MULTI-HOME PBB-EVPN NETWORK

TECHNICAL FIELD

The invention relates to computer networks and, more specifically, to forwarding packets within computer networks.

BACKGROUND

An Ethernet Virtual Private Network (EVPN) is a network service that provides Ethernet connectivity for two or more remote layer two (L2) local area networks (LANs) through an intermediate layer three (L3) network (usually referred to as a provider network), in a transparent manner, i.e., as if the intermediate L3 network does not exist. In particular, an EVPN transports L2 communications, such as Ethernet packets or "frames," between remote networks via the intermediate multiprotocol label switching (MPLS) network. In a typical configuration, provider edge (PE) network devices (e.g., routers and/or switches) of the intermediate networks coupled to the customer edge (CE) network devices of the customer networks define label switched paths (LSPs) (also referred to as pseudowires) within the intermediate network to carry encapsulated L2 communications as if these customer networks were directly attached to the same local area network (LAN). A provider backbone bridged (PBB) EVPN combines EVPN services as well as MAC-in-MAC encapsulation when transporting L2 communications. That is, each customer frame transported through the PBB-EVPN utilizes MAC-in-MAC encapsulation in which customer MAC (C-MAC) addresses within the header are encapsulated within backbone MAC (B-MAC) addresses, thereby maintaining separation between the provider L2 domain and the customer L2 domain.

SUMMARY

In general, techniques are described for performing split-horizon packet forwarding in a multi-homed Provider Backbone Bridging Ethernet Virtual Private Network (PBB-EVPN) network in which two or more of the provider edge (PE) devices of the PBB-EVPN are connected to a multi-homed customer network by a common Ethernet segment. For example, in a PBB-EVPN operating in redundancy mode, each customer edge (CE) device is multi-homed to multiple PE devices by a group of links, referred to as an Ethernet Segment. The techniques described herein may be applied by the PE devices of the multi-homed Ethernet segment to ensure that packets originating from the CE device and sent over the Ethernet segment to the PBB-EVPN are not replicated back to the CE device. That is, the PE devices coupled to the multi-homed Ethernet segment may apply the techniques to provide split-horizon packet forwarding so as to ensure that packets from the customer network that are injected into the PBB-EVPN by one of the PE devices of the multi-homed Ethernet segment are not forwarded back toward the customer network by a different one of the PE devices connected to the same multi-homed Ethernet segment.

In one example, a method may include receiving, by a first PE device and from a second PE device that implement a PBB-EVPN, a packet via a core-facing interface of the first PE device, wherein the first and second PE devices are coupled to a multi-homed CE device by an Ethernet segment, and wherein the first PE device has been elected a designated forwarder for forwarding packets from the PBB-EVPN to the CE device over the Ethernet segment. The method also includes determining, by the first PE device, that the received packet was previously received on a local interface associated with the Ethernet segment of the second PE device and forwarded into the PBB-EVPN by the second PE device. The method further includes, in response to determining that the received packet was previously received on the local interface associated with the Ethernet segment of the second PE device and forwarded into the PBB-EVPN by the second PE device, assigning a local interface of the first PE router associated with the Ethernet segment as an ingress interface of the received packet instead of the core-facing interface of the first PE device on which the packet was received from the PBB-EVPN. The method also includes applying split-horizon forwarding, based on the assigned ingress interface, to process the received packet without forwarding the received packet out the local interface to the Ethernet segment coupling the first PE device to the CE device.

In another example, a PE device may include a routing component having at least one processor coupled to a memory, wherein the routing component executes software configured to establish a PBB-EVPN with one or more other PE devices. The PE device may also include a core-facing interface to receive packets from the PBB-EVPN. The PE device may further include a local interface that connects the PE device to a CE device by an Ethernet segment, wherein the CE device is multi-homed to a second one of the PE devices by the Ethernet segment, and wherein the PE device has been elected a designated forwarder for forwarding packets from the PBB-EVPN to the CE device over the Ethernet segment. The PE device may also include a forwarding component configured to: responsive to determining that a packet received from the core-facing interface was previously received from the CE device by the second PE device over the Ethernet segment and forwarded into the PBB-EVPN by the second PE device, assign a local interface of the PE device associated with the Ethernet segment as an ingress interface of the received packet instead of the core-facing interface of the PE device on which the packet was received from the PBB-EVPN; and apply split-horizon forwarding, based on the assigned ingress interface, to process the received packet without forwarding the received packet out the local interface to the Ethernet segment coupling the PE device to the CE device.

In this way, the techniques described in this disclosure enable PE devices designated as designated forwarders (DF) in a PBB-EVPN to perform split-horizon packet forwarding of traffic by supplanting the appearance of a packet's origin through the forwarding engine's logical interface. As such, the techniques may be used to ensure that packets from the customer network that are injected into the PBB-EVPN by one of the PE devices of the multi-homed Ethernet segment are not forwarded back toward the customer network by a different one of the PE devices connected to the same multi-homed Ethernet segment.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 4A-4C are example block diagrams illustrating an example PBB-EVPN encapsulated packet header, I-SID table, and B-MAC table, respectively, in accordance with techniques of the disclosure.

DETAILED DESCRIPTION

Figure 1:
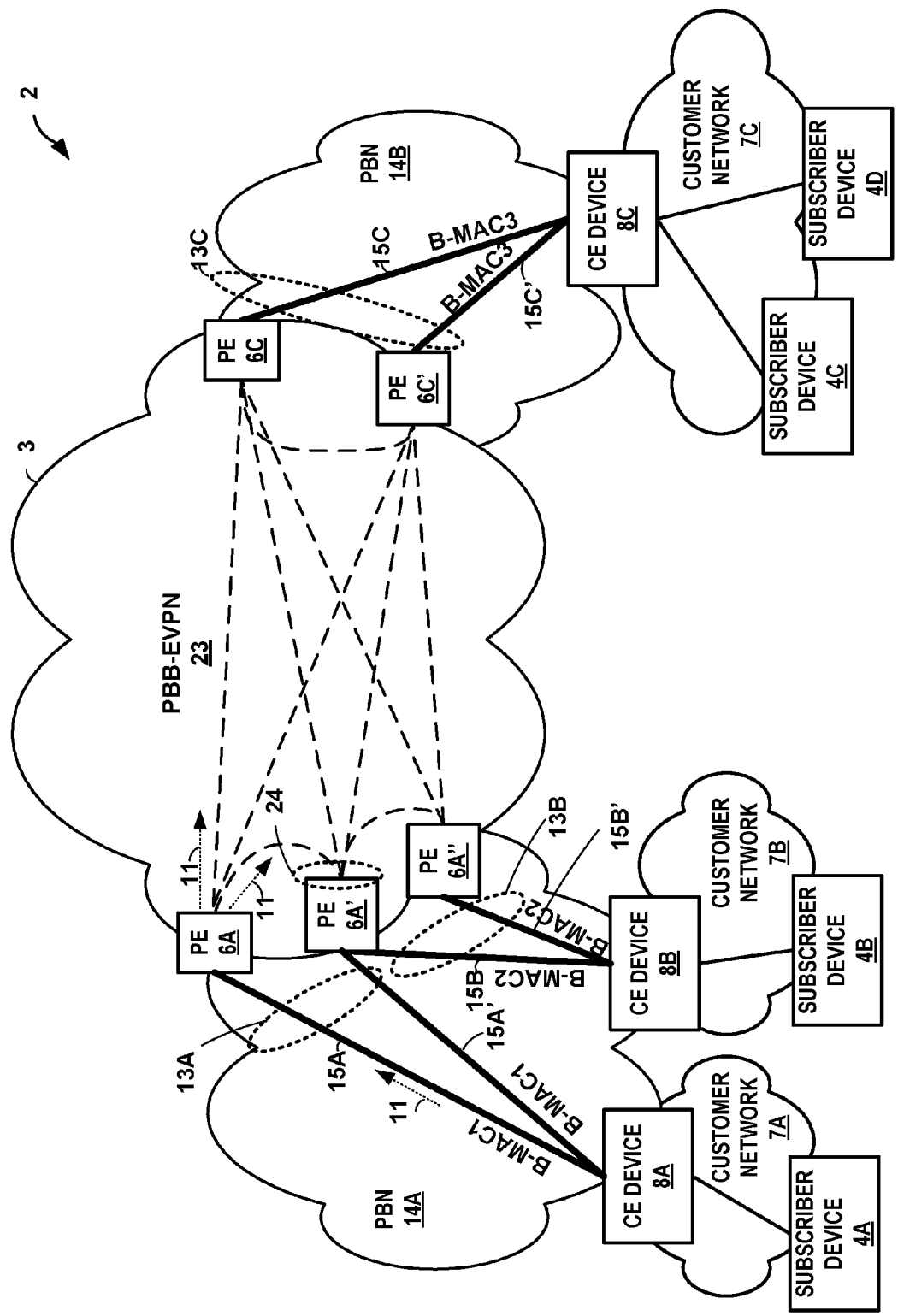
FIG. 1 is a block diagram illustrating an example network system in which provider edge devices coupled to a common Ethernet segment applies the techniques described herein to ensure split-horizon packet forwarding within a Provider Backbone Bridged Ethernet Virtual Private Network (PBB-EVPN).

FIG. 1 is a block diagram illustrating an example network system 2 in which provider edge (PE) routers coupled to a common Ethernet segment (ES) applies the techniques described herein to ensure split-horizon packet forwarding within a Provider Backbone Bridged Ethernet Virtual Private Network (PBB-EVPN). As shown in the example of FIG. 1, PE devices 6A, 6A', 6A", 6C, and 6C' (collectively, "PE devices 6") (e.g., routers and/or switches) may operate at the border of network 3 and provide connectivity for provider bridge networks (PBN) 14A and 14B (collectively, "PBNs 14"). Network 3 may be a wide area network (WAN), local area network (LAN), personal area network (PAN), metropolitan area network (MAN), internet area networks (IAN), campus area networks (CAN), and any network capable of transmitting traffic exchanged between PE devices 6. Network 3 may be used to connect individual subscribers, businesses, or even large-scale data centers to a larger service network or the Internet. In one example, network 3 conforms to the standards set forth in "Provider Backbone Bridging Combined with Ethernet VPN (PBB-EVPN)," draft-ieft-l2vpn-pbb-evpn-10, Internet Engineering Task Force (IETF), May 14, 2015, the entire contents of which are incorporated herein by reference.

In general, each of PBNs 14 includes one or more customer edge (CE) devices 8A, 8B, and 8C (collectively, "CE devices 8") (e.g., routers and/or switches) that connect the PBNs 14 to subscriber devices 4A-4D (collectively, "subscriber devices 4") that provide computing environments for subscribers or customers. Each of PBNs 14 also includes one or more of the PE devices 6 that connect the PBNs 14 via PBB-EVPN 23.

PBB-EVPN 23 provides layer two (L2) connectivity between the PBNs 14. Each of PBNs 14 represents an infrastructure of a service provider that provides bridged local area network services to L2 customer networks. Each of PBNs 14 provides one or more service VLANs ("S-VLANS") to services and isolate L2 traffic from L2 customer networks 7A-7D (collectively, "customer networks 7"). PBNs 14 may include L2 bridging networks provided by the same network service provider or by one or more different service providers. Although shown by way of example with respect to two PBNs 14A, 14B, network 3 may include more than two PBNs.

In the example of FIG. 1, PBB-EVPN 23 is composed of a set of Backbone Edge Bridges (BEBs) provided by backbone-facing (i.e., core-facing) components of PE devices 6. That is, each of PE devices 6 provides a BEB for bridging to the backbone domain of PBB-EVPN 23. Each BEB of PE devices 6 provides interfaces that encapsulate (or verifies the encapsulation of) and aggregate customer frames, thus allowing customer MAC (C-MAC) addresses and VLANs to be independent of the backbone MAC (B-MAC) addresses and VLANs administered by the PBB-EVPN operator. In this way, each of PBNs 14 provide L2 bridging connectivity for one or more of L2 customer networks 7. In this example, subscriber devices 4A and 4B of L2 customer networks 7A, 7B are coupled to PBN 14A by CE devices 8A and 8B. Subscriber devices 4C and 4D of L2 customer network 7C are coupled to PBN 14B by CE device 8C.

PE devices 6 that form the ends of tunnels within the backbone domain provided by PBB-EVPN 23 typically learn and maintain L2 state information (e.g., media access control (MAC) addresses and respective physical ports by which the MAC addresses are reachable) for devices within the PBB-EVPN 23. PE devices 6 may also learn and maintain L2 state information including MAC addresses and corresponding ports for devices in both the customer domain and the backbone domain to provide bridging services as BEBs. Conversely, CE devices 8 may learn and maintain L2 state information including MAC addresses for subscriber devices 4 within a customer domain 7. In this way, PE devices 6 may provide a PBB-EVPN interconnect between subscriber devices 4. As such, each of PE devices 6 operates as a gateway between PBB-EVPN 23 and PBN 14, and may function as tunneling endpoints with respect to PBNs 14. That is, each of PE devices 6 may include logically separate routing instances for PBN 14 and PBB-EVPN 23 and each operates to bridge traffic between the two distinct internal routing instances.

In operation, L2 network communications (e.g., Ethernet packet frames) flow between PBNs 14 via PBB-EVPN 23. Customer traffic originating from L2 customer networks 7 typically arrive at CE devices 8 in association with a customer VLAN (C-VLAN). That is, packets from L2 customer networks 7 typically carry C-VLAN tags and customer VLAN identifiers (C-VID) in addition to source and destination media access control (MAC) addresses for devices within the L2 customer networks 7. PE devices 6 receive the L2 communications from L2 customer networks 7 and associate the communications with a service VLAN (S-VLAN) defined within the PBN, such as PBN 14. Each S-VLAN has a corresponding identifier (S-VID), which is tagged in each L2 frame with a corresponding PBN 14 with which the L2 frame was received.

Traffic flowing from one PBN 14 through PBB-EVPN 23 to a different PBN 14 is carried by the S-VLAN and is further multiplexed within a backbone VLAN (B-VLAN) and service ID (I-SID) that uniquely identifies the subscriber devices 4 (e.g., by customer MAC (C-MAC) address), in addition to source and destination backbone MAC (B-MAC) addresses for PE devices 6 within PBB-EVPN 23. As operational BEBs, PE devices 6 provide a mapping between the VLAN and MAC address space of PBNs 14 and PBB-EVPN 23. Each of PE devices 6 may have a set of one or more unicast B-MAC addresses associated with the C-MAC addresses and associated with a Backbone Edge Bridge (BEB) functionality, and the B-MAC addresses are exchanged between PE devices 6 over the network 3 (such as the MPLS core), such as by MAC Advertisement routes utilizing Border Gateway Protocol (BGP). This way, PE devices 6 may distribute B-MAC addresses of the PE devices instead of C-MAC addresses of subscriber devices 4.

In one example, packet frames may flow from CE device 8A to other CE devices 8 over a S-VLAN bridged to flow through a B-VLAN, which in turn is tunneled through transport MPLS label switched paths (LSPs) of the PBB- EVPN 23. The traffic of S-VLAN may flow through PBB-EVPN 23 from PE device 6A to other PE devices 6 via B-VLAN in which the traffic is further encapsulated and de-capsulated via PE devices 6 operating as BEBs. Each of PE devices 6 has a set of one or more B-MAC addresses associated with it, which are exchanged between the PE devices over the network 3 (e.g., MPLS core network) in MAC Advertisement routes. PE devices 6 may receive Ethernet packets from a customer and may encapsulate the packets with the Ethernet Provider Backbone Bridging (PBB) header and Multiprotocol Label Switching (MPLS) header (e.g., as shown herein in FIG. 4A), and forward the encapsulated packet over the core network 3. Likewise, PE devices 6 may receive the encapsulated packets from the PBB-EVPN and de-capsulate the PBB header and MPLS header from the packet. In this way, PE devices 6 provide bridging services as BEBs for traffic flowing between PBN 14 and PBB-EVPN 23.

In the example of FIG. 1, each of CE devices 8 is "multi-homed" in that each of the CE devices are connected to multiple PE devices 6 by a respective Ethernet segment 13. When a CE device 8 is multi-homed to two or more PE devices 6 as shown in this example, the set of Ethernet links 15A, 15A', 15B, 15B', 15C, and 15C' (collectively, "links 15") constitutes Ethernet segments 13A-13C, respectively. Each of the Ethernet segments 13 appears as a single logical interface (IFL) associated with a Link Aggregation Group (LAG) to the respective CE device 8. For instance, links 15A, 15A' from PE devices 6A, 6A' to which CE device 8A is multi-homed form Ethernet segment 13A. Likewise, links 15B, 15B' from PE devices 6A', 6A" to which CE device 8B is multi-homed form Ethernet segment 13B.

Moreover, when a CE device 8 is multi-homed to two or more PE devices 6, one of the PE devices, referred to as the designated forwarder (DF), assumes the primary role for forwarding broadcast, unknown unicast, and multicast (BUM) traffic, such as BUM traffic 11, from PBB-EVPN 23 to CE devices 8. That is, for each Ethernet segment 13, the respective PE device 6 elected as the DF for that Ethernet segment assumes responsibility for forwarding BUM traffic, received from PBB-EVPN 23 via a core-facing interface 24, toward CE devices 8 coupled to that Ethernet segment. For example, PE device 6A', which may be elected as the DF router, may forward BUM traffic 11 received from PBB-EVPN 23 toward CE device 8A, 8B coupled to Ethernet segments 13A, 13B, respectively. The remaining PE devices 6 coupled to that same Ethernet segment (e.g., PE device 6A) are referred to as non-designated forwarders (non-DFs) or backup designated forwarders (BDFs) and do not forward BUM traffic received from PBB-EVPN 23 into the respective Ethernet segment. In this way, links 15 within PBN 14A provide connectivity of customer networks 7A, 7B.

As further described below, PE devices 6 apply techniques described herein to perform split-horizon packet forwarding to ensure that packets originating from a CE device 8 and sent over an Ethernet segment 13 toward the PBB-EVPN 23 are not replicated back to the same CE device. For example, PE devices 6A, 6A' that provide multi-homed connectivity to CE device 8A by Ethernet segment 13A may apply the techniques described herein to provide split-horizon forwarding so as to ensure that BUM traffic 11 from CE device 8A that is injected into PBB-EVPN 23 by one of the PE devices 6A, 6A' is not forwarded back toward CE device 8A. As one example, in operation, PE device 6A' may be elected the DF for Ethernet segment 13A. CE device 8A may forward BUM traffic 11 from customer network 7A toward PE device 6A (a non-DF) by way of physical link 15A of Ethernet segment 13A. Upon receiving BUM traffic 11, PE device 6A injects the BUM traffic into PBB-EVPN 23 such that the BUM traffic is forwarded to all other PE devices 6, including PE device 6A'. BUM traffic 11 may, for example, be encapsulated with key information, such as a source backbone MAC address (B-MAC), customer and source virtual local area network identifiers (C-VLAN and S-VLAN IDs), and service ID (I-SID) associated with Ethernet segment 13A (e.g., as shown herein in FIG. 4A). Moreover, as further described below, PE device 6A' applies the techniques described herein to avoid forwarding BUM traffic 11 back to CE device 8A, which PE device 6A' would otherwise do as the DF for Ethernet segment 13A.

For example, after BUM traffic 11 is received by PE device 6A' via a core-facing interface 24, PE device 6A', as a DF router, may determine whether the BUM traffic was previously received on a local interface associated with PE device 6A and was sourced into PBB-EVPN 23 by PE router 6A. For example, when a core-facing interface 24 of PE device 6A' receives a packet, the PE device may perform lookup operations based on one or more keys of the packet. These keys may include a B-MAC, I-SID, and VLAN identifications (e.g., C-VLAN and S-VLAN) of the packet for determining whether the packet received from the core-facing interface 24 was previously received on a local interface, such as link 15A of Ethernet segment 13A before being forwarded into the PBB-EVPN 23. A lookup operation based on the one or more keys may enable PE router 6A' to determine whether the keys map the received packet from the local interface of PE router 6A' to the local interface of PE router A. This may include determining whether the B-MAC addresses assigned to PE devices 6A, 6A' are the same and match the B-MAC address of the received packet. In other words, PE device 6A' may determine the mapping of the packet to determine whether the interface of the packet matches a local interface associated with PE device 6A'.

In response to determining that the packet matches the local interface associated with the PE device 6A', PE device 6A' may assign the local interface (link 15A' of Ethernet segment 13A) associated with PE device 6A' as an ingress interface of the received packet instead of the core-facing interface 24 on which the packet was received from the PBB-EVPN 23. In other words, PE device 6A' may now view the ingress interface as if the received packet originated from a local interface, such as link 15A' of Ethernet segment 13A. As a result, by application of typical L2 forwarding operations, the PE device designated as DF for a given Ethernet segment does not forward BUM packet 11 to the local CE device 8 since, according to the dynamically modified ingress interface, the BUM packet appears to have originated from the interface associated with the local CE device, and flooding rules for L2 traffic prevent forwarding L2 traffic back to the source. Moreover, the DF router may, according to typical L2 forwarding rules, forward the packet in the same bridge domain to other CE devices 8 through their corresponding logical interfaces except for the dynamically modified ingress interface of the PE device. In this way, the techniques enable split-horizon packet forwarding to be applied for a given customer router even though that customer router is multi-homed to multiple PE devices 6 by way of a multi-link Ethernet segment. That is, the techniques described herein enable split-horizon packet forwarding to be achieved across an entire Ethernet segment, and split-horizon packet forwarding across all links of the Ethernet segment can be achieved even in the context of a PBB-EVPN.

Moreover, during this process, due to the techniques described herein, PE device 6, such as PE device 6A', updates its internal MAC table to identify the source customer MAC address of BUM traffic 11 as reachable through the customer-facing local interface connected to Ethernet segment 13A rather than the core-facing interface 24 on which BUM traffic 11 was actually received. This may provide the additional advantage that PE device 6A' uses the perceived source path as a shorter route for delivery of any return traffic that is directed to the customer MAC address.

Figure 2:
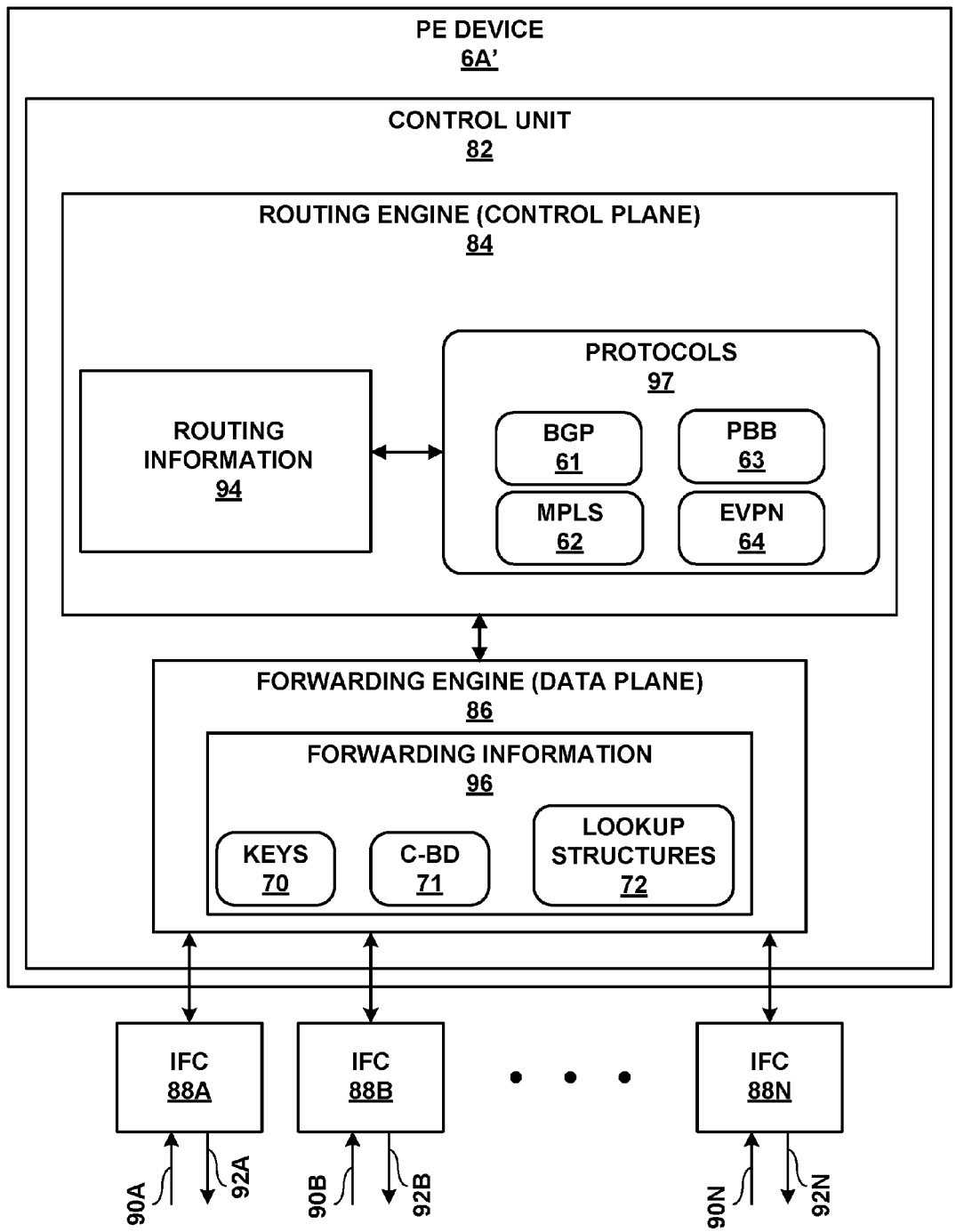
FIG. 2 is a block diagram illustrating an example provider edge device capable of performing the disclosed techniques.

FIG. 2 is a block diagram illustrating an example PE device, such as PE device 6A', capable of performing the disclosed techniques. In this example, PE device 6A' includes interface cards 88A-88N ("IFCs 88") that receive packets via incoming links 90A-90N ("incoming links 90") and send packets via outbound links 92A-92N ("outbound links 92"). IFCs 88 are typically coupled to links 90, 92 via a number of interface ports. PE device 6A' also includes a control unit 82 that determines routes of received packets and forwards the packets accordingly via IFCs 88. Although described with respect to PE device 6A' as an example, any of PE devices 6 may operate according to the example of FIG. 2.

In the example of FIG. 2, control unit 82 includes a routing engine 84 (control plane) that configures and controls packet forwarding operations applied by packet forwarding engine 86 (data plane). Routing engine 84 operates as a control plane for PE device 6A' and includes an operating system that provides a multi-tasking operating environment for execution of a number of concurrent processes. That is, routing engine 84 provides an operating environment for execution of various protocols 97 that may comprise software processes having instructions executed by a computing environment. As described in further detail below, protocols 97 provide control plane functions for storing network topology in the form of routing tables or other structures, executing routing protocols to communicate with peer routing devices and maintain and update the routing tables, and providing management interface(s) to allow user access and configuration of router 80. Control unit 82 provides an operating environment for routing engine 84 and may be implemented solely in software, or hardware, or may be implemented as a combination of software, hardware or firmware. For example, control unit 82 may include one or more processors which execute software instructions. In that case, routing engine 84 may include various software modules or daemons (e.g., one or more routing protocol processes, user interfaces and the like), and control unit 82 may include a computer-readable storage medium, such as computer memory or hard disk, for storing executable instructions.

In the example of FIG. 2, protocols 97 includes the Border Gateway Protocol (BGP) 61, for exchanging routing information with other routing devices and for updating routing information 94. Protocols 97 may also include Multiprotocol Label Switching Protocol (MPLS) 62 for tunneling packets within network 3 via label switched paths. In addition, routing engine 84 executes a PBB protocol 63 so as to implement provider backbone bridging, such as the techniques described in IEEE 802.1ah-2008, Provider Backbone Bridges, June 2008, the entire contents of which are incorporated herein by reference. For example, PBB protocol 63 provides for the exchange of control plane messages that include PBB configuration information, such as announcing B-MAC addresses. In accordance with the techniques PBB protocol 63 configures forwarding information 96 with forwarding constructs to direct forwarding engine 86 to encapsulate network packets with PBB headers, such as source and destination B-MAC addresses, when injecting the packets into PBB-EVPN 23 and to de-encasulate the packets when receiving them from the PBB-EVPN. Further, routing engine 84 executes EVPN protocol 64, which operates to communicate with other routers to establish and maintain an EVPN, for transporting L2 communications through an intermediate network so as to logically extend an Ethernet network through the intermediate network. EVPN protocol 64 may operate in accordance with techniques described in "BGP MPLS-Based Ethernet VPN," RFC 7432, February 2015, the entire contents of which are incorporated herein by reference.

In general, routing protocols 97 maintains routing information 94 in the form of routing information base (RIB) that describes a topology of a network, and derives a forwarding information 96 in accordance with the routing information. In general, routing information 94 represents the overall topology of the network, including overlay LSP paths for transporting packets through PBB-EVPN 23. Protocols 97 update routing information 94 based on routing protocol messages received by PE device 6A'. Routing information 94 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, forwarding information 86 is generated based on selection of certain routes within the network and maps packet key information (e.g., L2/L3 source and destination addresses and other select information from a packet header) to one or more specific next hops forwarding structures within forwarding information 96 and ultimately to one or more specific output interface ports of IFCs 88. Routing engine 84 may generate forwarding information 96 in the form of a radix tree having leaf nodes that represent destinations within the network. Example details of an example embodiment of a router that utilizes a radix tree for route resolution are provided in U.S. Pat. No. 7,184,437, the contents of which being incorporated herein by reference in its entirety.

As described herein, routing engine 84 communicates with other routers to establish and maintain a PBB-EVPN, such as the PBB-EVPN 23, for transporting communications through networks so as to logically extend an Ethernet network through the intermediate network. Routing engine 84 may, for example, communicate with PBB-EVPN protocols executing on remote routers to establish tunnels (e.g., LSPs or GRE tunnels) for transporting the packets through the PBB-EVPN. As such, routing information 94 includes routing information for interfacing with the PBB-EVPN as well as customer networks, such as service identifier (I-SID) information, customer virtual local area network (C-VLAN) information, and service virtual local area network (S-VLAN) information. Moreover, routing engine 84 maintains backbone MAC (B-MAC) address tables (e.g., as shown in FIG. 4C) in the control plane of PE device 6A', where a B-MAC table includes one or more B-MAC addresses 76 as keys and a list of identifiers of PE devices included in an Ethernet segment that corresponds to the B-MAC address. Routing information 94 may include the B-MAC address of PE device 6A' and B-MAC address of PE device 6A, as well as information on the local interfaces associated with the B-MAC address.

When implementing the PBB-EVPN, PE device 6A performs L2 customer MAC (C-MAC) learning in the dataplane, i.e., within forwarding engine 86 as packets are forwarded. In this way, C-MAC addresses are not typically distributed by control plane MAC Advertisement routes over the network 3. In contrast, L2 B-MAC learning may be performed in the control plane by exchanging, with remote PE devices, BGP messages containing B-MAC addresses. PBB protocol 63 configures forwarding information 96 within forwarding engine 86 so as to implement provider backbone bridging when forwarding packets. For example, PBB protocol 63 communicates B-MAC addresses 76 for a PBB, as recorded in B-MAC tables, to forwarding engine 86 so as to configure forwarding information 96. In this way, forwarding engine 86 may be programmed with associations between each tunnel and output interface and specific source B-MAC addresses reachable via those tunnels.

As explained above, forwarding information 96 associates network destinations with specific next hops and corresponding IFCs 88 and physical output ports for output links 92. Moreover, forwarding information 96 may specify operations, such as encapsulation with PBB-EVPN tags or de-encapsulation of packets, to be applied when forwarding packets to the next hops. Forwarding information 96 may be a radix tree programmed into dedicated forwarding chips, a series of tables, a complex database, a link list, a radix tree, a database, a flat file, or various other data structures. In some examples, forwarding engine 86 arranges forwarding structures as next hop data that can be chained together as a series of "hops" along an internal packet forwarding path for the network device. In many instances, the forwarding structures perform lookup operations within internal memory of ASICs included in forwarding engine 86, where the lookup may be performed against a tree search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs determines the manner in which a packet is forwarded or otherwise processed by forwarding engine 86 from its input interface on one of IFCs 88 to its output interface on one of IFCs 88.

As shown in FIG. 2, forwarding information 96 specifies keying information (e.g., keys 70, customer bridge domain (C-BD) information 71, and lookup structures 72) that is compared to keys within network packet to select appropriate next hops and corresponding operations to be applied when forwarding the network packets. Keys 70 may include source backbone media access control (B-MAC) address, service ID (I-SID), service provider VLAN (S-VLAN), and customer VLAN (C-VLAN). In accordance with the techniques described herein, forwarding information 96 may be configured with mappings or associations between B-MAC addresses and Ethernet segments, which may be stored in a B-MAC table (e.g., as shown in FIG. 4C). Keys 70 also include I-SID information such as data representing mappings or associations between C-MAC addresses and B-MAC addresses that may be stored in an I-SID table (e.g., as shown in FIG. 4B). In one example, a B-MAC address may be a key with a C-MAC address as a corresponding value. Keys 70 may also include customer VLAN (C-VLAN) information and service VLAN (S-VLAN) information that represents mappings or associations between a customer and service provider.

In accordance with the techniques of this disclosure, routing engine 84 configures forwarding engine 86 to perform split-horizon packet forwarding in a multi-homed PBB-EVPN 23 network in which PE devices 6A, 6A' and 6A" are coupled to multi-homed customer network 7A by a common Ethernet segment 13A. Forwarding engine 86 applies the techniques described herein to ensure that packets originating from CE device 8A and sent over Ethernet segment 13A to the PBB-EVPN 23 by a different one of the PE devices 6 coupled to the Ethernet segment are not replicated back to the CE device. That is, in reference to the example of FIG. 2, forwarding engine 86 of PE device 6A' provides split-horizon packet forwarding so as to ensure that packets from the customer network that are injected into the PBB-EVPN by one of the PE devices (e.g., PE device 6A) of the multi-homed Ethernet segment are not forwarded back toward the customer network by a different one of the PE devices connected to the same multi-homed Ethernet segment. In particular, when forwarding a packet, forwarding engine 86 determines whether the received packet was previously received on a local interface associated with Ethernet segment 13A of another PE device coupled to that Ethernet segment and forwarded into the PBB-EVPN by that PE device. Responsive to the determination, forwarding engine 86, internally assigns a local interface associated with the Ethernet segment as an ingress interface of the received packet instead of the core-facing interface on which the packet was received from the PBB-EVPN. Forwarding engine 86 then applies split-horizon forwarding, based on the assigned ingress interface instead of the actual ingress interface, so as to process the received packet without forwarding the received packet.

As one example, PE device 6A' may initially receive encapsulated BUM traffic 11 (e.g., as shown in FIG. 4A) from PBB-EVPN 23 at interface 88A, which may be a core-facing interface 24, from PE device 6A. Forwarding engine 86 identifies the MPLS header of the BUM traffic 11 and may perform a MPLS lookup to determine a table next hop by de-encapsulating the MPLS and PBB headers in accordance with the MPLS protocol 62 and the PBB protocol 63. At this time, the forwarding engine 96 performs a lookup operation to compare the inner keys 70 of the packet, such as B-MAC, C-VLAN, and S-VLAN, with forwarding information 96. Utilizing the keys 70, forwarding engine 86 may determine that the received BUM traffic 11 was previously received on a local interface (e.g., link 15A of FIG. 1) associated with Ethernet segment 13A of PE device 6A and forwarded into PBB-EVPN by PE device 6A. For example, forwarding engine 86 may determine that the packet contains the same B-MAC and other information, e.g., I-SID assigned to PE device 6A' for Ethernet segment 13A. Responsive to the determination, forwarding engine 86 modifies the forwarding engine's 86 view of the packet's ingress interface by assigning a local interface of PE device 6A', such as an interface coupled to link 15A' of Ethernet segment 13A, as an ingress interface of PE device 6A'. As such, subsequent lookups and packet processing operations are applied by forwarding engine 86 as if the packet was received from an interface of PE device 6A coupled to the same Ethernet segment as PE device 6A'.

In this way, after reassigning the packet to a different ingress interface than the actual one it was received, forwarding engine 86 performs packet forwarding operations and L2 learning operations as if the packet was received from Ethernet segment 13A. As such, when subsequently processing the packet, forwarding engine 86 performs L2 MAC address learning by updating its internal MAC table to identify the source customer MAC address of BUM traffic 11 as reachable through the customer-facing interface connected to Ethernet segment 13A rather than the core-facing interface 24 on which BUM traffic 11 was actually received. This may provide the additional advantage that PE device 6A' uses the perceived source path as a shorter route for delivery of any return traffic that is directed to the customer MAC address.

Moreover, forwarding engine 86 processes the packet according to forwarding information 96 and lookup structures 72 to select one or more interfaces to which to forward the BUM traffic. For example, lookup structures 72 may map to packet to a next hop based on the keys 70 and C-BD 71 to identify one or more output interfaces. One or more next hops within forwarding information 86 may be "chained," such that a set of chained next hops performs a set of operations for respective different next hops when executed. Examples of such operations may include applying one or more services to a packet, dropping a packet, and/or forwarding a packet using an interface and/or interface identified by the one or more next hops. In accordance to techniques of this disclosure, when the ingress interface of PE device 6A' is re-assigned to the local interface associated Ethernet segment 13A, the PE device 6A' may determine from the lookup structures 72 to drop a packet to prevent forwarding the received packet out the local interface to Ethernet segment 13A (e.g., link 15A'). For example, PE device 6A' may receive BUM traffic 11 from PE device 6A through the core-facing interface 24. PE device 6A' may, as the DF router, initially be set to forward a packet to all CE devices (e.g., 8A, 8B) within the same domain. However, a lookup of keys 70 within the packet may yield the same B-MAC address (e.g., B-MAC1) that is similarly configured on all interfaces of PE devices 6A, 6A' belonging to an Ethernet segment 13A. As such, forwarding engine 86 of PE device 6A' modifies its view of the ingress interface of the packet to appear as though BUM traffic 11 was received from link 15A' of Ethernet segment 13A instead of core-facing interface 24. Forwarding engine 86 of PE router 6A' may then determine from forwarding information 96, such as lookup structures 72, to forward the received BUM traffic 11 to CE device 8B without forwarding the traffic back to CE device 8A. This way, PE device 6A' may provide split-horizon packet forwarding so as to ensure that packets from the customer network that are injected into the PBB-EVPN by PE device 6A of the multi-homed Ethernet segment 13A are not forwarded back toward the customer network by PE device 6A' connected to the same multi-homed Ethernet segment 13A.

The architecture of PE device 6A' illustrated in FIG. 2 is shown for exemplary purposes only. The invention is not limited to this architecture. In other examples, PE device 6A' may be configured in a variety of ways. In one example, some of the functionally of control unit 82 may be distributed within IFCs 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors that execute software instructions. In that case, the various software modules of control unit 82 may comprise executable instructions stored on a computer-readable medium, such as computer memory or hard disk.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Figure 3:
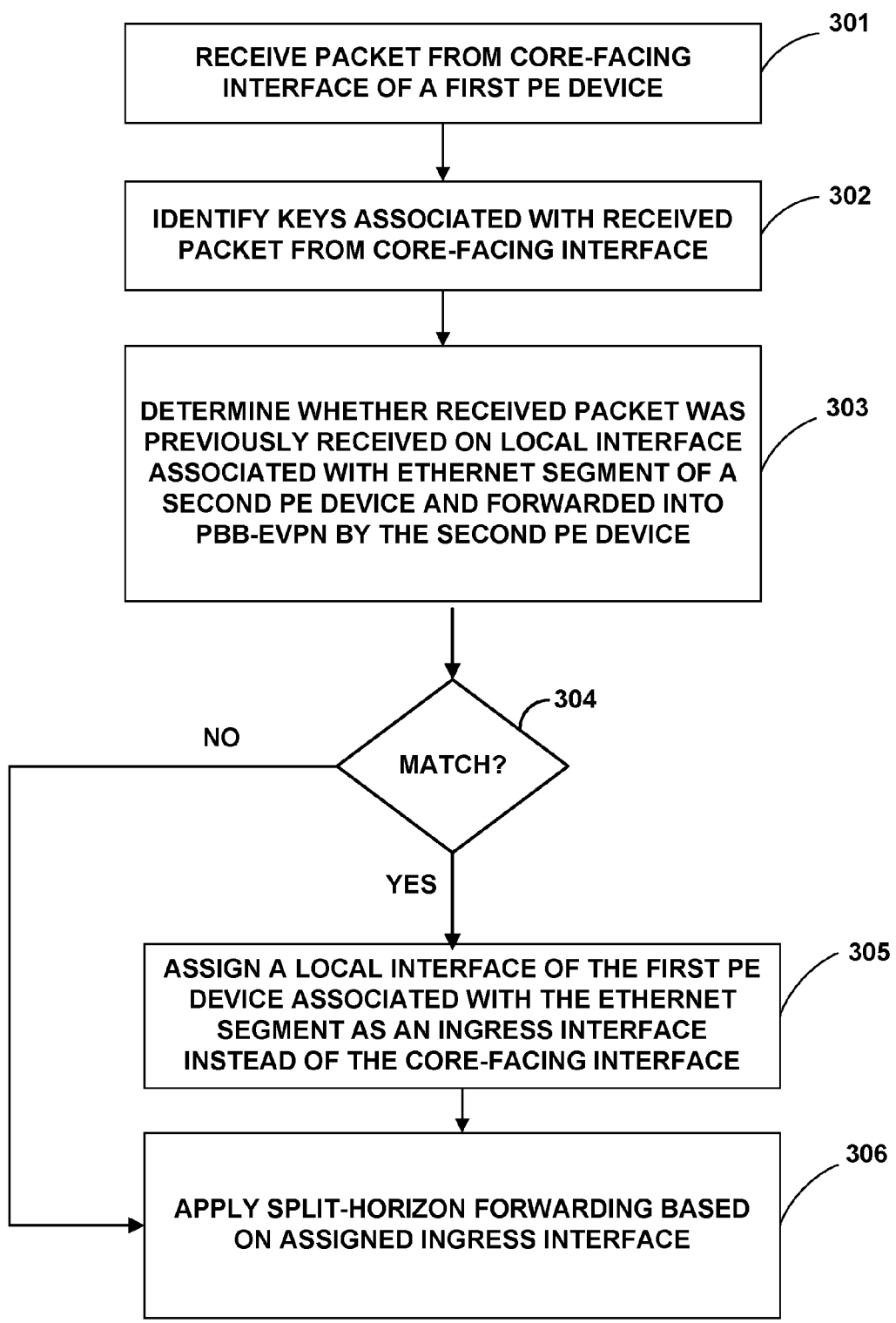
FIG. 3 is a flowchart illustrating an example operation of a provider edge device implementing the techniques described herein to provide split-horizon packet forwarding within a PBB-EVPN.

FIG. 3 is a flowchart illustrating example operation of a PE router in accordance with the techniques described herein. For purposes of example, FIG. 3 is explained with respect to PE devices 6A of FIG. 1.

Initially, PE device 6A may initially receive BUM traffic 11 that originated from customer network 7A via CE device 8A. PE device 6A, a non-designated forwarder (non-DF) router, injects the BUM traffic 11 into PBB-EVPN 23 such that the BUM traffic is forwarded to all other PE devices 6, including PE device 6A'. One of the PE devices, such as PE device 6A' of FIGS. 1 and 2, may receive BUM traffic 11 from PE device 6A within the PBB-EVPN through a core-facing interface 24 (301). PE device 6A', which may be elected as a designated forwarder (DF), may receive the encapsulated BUM traffic 11 (e.g., PBB-EVPN Header shown in FIG. 4A) from the core-facing interface 24 and may identify keys 70 within the encapsulated BUM traffic (302).

In response, control unit 82 of PE device 6A' processes the received BUM traffic 11 to select ports to which to flood BUM traffic 11. To do so, forwarding engine 86 may identify keys 70 from the de-encapsulated packet, such as source backbone media access control (B-MAC) address, service ID (I-SID), service provider VLAN (S-VLAN), and customer VLAN (C-VLAN). In one example, based on the identified keys 70, forwarding engine 86 of PE device 6A' may determine that the received BUM traffic 11 was previously received from PE device 6A through link 15A of Ethernet segment 13A and was forwarded into the PBB-EVPN 23 (303). For example, forwarding engine 86 may perform a lookup of one or more tables to compare the source B-MAC address assigned to PE device 6A' for the particular Ethernet segment with the B-MAC address of the received BUM traffic 11. Since PE devices 6 are operating as provider bridges with the same B-MAC address for Ethernet segment 13A, a match of B-MAC addresses with corresponding S-VLAN or I-SID would indicate that the received BUM traffic 11 was previously received from PE device 6A through link 15A of Ethernet segment 13A, which is the same Ethernet segment associated with link 15A' of PE device 6A'.

In response to determining that the received BUM traffic 11 was previously received on a local interface (e.g., link 15A) associated with Ethernet segment 13A and forwarded into the PBB-EVPN 23 by PE device 6A (YES of 304), PE device 6A' assigns a local interface associated with Ethernet segment 13A, such as an interface coupled to link 15A', as the packet's ingress interface instead of core-facing interface 24 on which the packet was received (305). As stated above, this effectively modifies application of any subsequent forwarding operations applied by forwarding engine 86 to the packet by assigning a local interface of PE device 6A', such as link 15A' of Ethernet segment 13A, as an ingress interface of PE device 6A'. Thus, subsequent lookup operations and L2 MAC address learning operations applied to the packet by forwarding engine 86 of PE device 6A' using keys 70 of the packet are implemented as if the packet was received directly from Ethernet segment 13A instead of from PBB-EVPN 23.

Forwarding engine 86 applies split-horizon forwarding rules, based on the assigned ingress interface, to process the received BUM traffic 11 without forwarding the packet out the local interface (e.g., link 15A') to Ethernet segment 13A coupling PE device 6A' to the CE device 8A (306). During the forwarding process, forwarding engine 86 may perform lookups on the customer bridge domain (C-BD), such as the customer MAC (C-MAC) address associated with the received BUM traffic 11, from a MAC table based on the identified keys 70 extracted from the packet. PE device 6A' may also perform a lookup of I-SID table (e.g., as shown in FIG. 4B) according to the B-MAC address key and I-SID key. PE device 6A' may also perform lookup operations based on keys such as C-VLAN and S-VLAN to determine mappings or associations between a customer and service provider. For instance, a lookup of the I-SID key may identify the subscriber devices 4 associated with the received packet, such as by C-MAC address. Moreover, a lookup based on the C-VLAN and S-VLAN keys would yield information regarding the customer network that originated the packet. Based on the lookups, forwarding engine 86 selects output interfaces, if any, to which to forward the packet. At this time, forwarding engine 86 applies split-horizon forwarding rules to prune from the list of interfaces the ingress interface from which the packet was received, thereby ensuring the packet is not forwarded out the same interface on which it was received. As such, by applying the split-horizon forwarding rules, based on the assigned ingress interface, packet forwarding engine 86 may forward the received BUM traffic 11 to different CE devices (e.g., CE device 8B) coupled to PE device 6A' by a link other than the Ethernet segment 13A, such as Ethernet segment 13B, or may drop the packet. Moreover, by re-assigning the ingress interface in certain situations as described herein, PE device 6A' may provide split-horizon packet forwarding so as to ensure that packets from the customer network that are injected into the PBB-EVPN by PE device 6A of the multi-homed Ethernet segment 13A are not forwarded back toward the customer network by PE device 6A' connected to the same multi-homed Ethernet segment 13A.

Further, when processing the packet, forwarding engine 86 performs L2 MAC address learning by updating MAC address tables with reachability information. As such, assigning the local interface as the ingress interface (305) has the benefit that the update of the MAC table of PE device 6A' to identify the source customer MAC address of the received BUM traffic 11 as reachable through the local interface (e.g., link 15A') associated with the Ethernet segment 13A of the PE device 6A', i.e., directly through Ethernet segment 13A instead of through the PBB-EVPN 23. This enables PE router 6A' to forward any return traffic out the local interface to Ethernet segment 13A, such as link 15A', coupling PE device 6A' to CE device 8A without forwarding the return traffic to PBB-EVPN 23.

FIGS. 4A-4C are example block diagrams illustrating an example PBB-EVPN encapsulated packet, an example I-SID table, and an example B-MAC table, respectively, that may be utilized by the techniques of the disclosure.

FIG. 4A, for example, is a block diagram illustrating an example packet format for PBB EVPN packet (e.g., encapsulated BUM traffic 11) that includes a PBB-EVPN header and L2 payload. As shown in FIG. 4A, PBB-EVPN header 400 includes an outer transport label 401 and inner MPLS service label 402. MPLS service label 402 may be a MPLS label that uniquely identifies PE device 6A of FIG. 1 within an EVPN instance (EVI). For instance, PE device 6A may advertise MPLS service label 402 to other PE devices in the same EVI (e.g., PE devices 6A', 6A"). Outer transport label 401 may be an MPLS label advertised by a provider router in network 3 that is one hop away from PE device 6A, such as PE device 6A'. PBB-EVPN header 400 includes keys 70, such as destination B-MAC address 403 and source B-MAC address 404. For instance, PE device 6A, when sending a network packet to PE device 6A', may include a destination address 403 of B-MAC2 and a source address 404 of B-MAC1.

PBB-EVPN header 400 also includes Ethertype 405 and service ID (I-SID) 406. Ethertype 405 may be a unique value that indicates the type of packet, i.e., a PBB-EVPN packet. I-SID 406 may be an identifier of a PBB B-Service instance such as the aforementioned B-MAC1 and B-MAC2 addresses. PBB-EVPN header 400 also includes destination C-MAC address 407 and source C-MAC address 408. In one example, when PE device 6A sends a network packet to PE device 6A', destination C-MAC address 407 may be a C-MAC address of subscriber device 4B and source C-MAC 408 may be a C-MAC address of subscriber device 4A.

When PE device 6A' receives the PBB-EVPN header 400 from PE device 6A, PE device 6A' may de-encapsulate the packet to determine source and destination B-MAC addresses 403 and 404. This in turn enables PE device 6A' to lookup the B-MAC routing table to determine the Ethernet segment identifier (ESI) associated with the received packet, as described above. Moreover, PE device 6A' may de-encapsulate the packet to determine the I-SID (406) information. This in turn enables PE device 6A' to lookup the I-SID table to determine the association between the B-MAC address and the source C-MAC address, as described above.

FIG. 4B is a block diagram that illustrates an example I-SID table 410 maintained by a forwarding engine of a PE device, such as PE device 6A'. For example, forwarding engine 86 may be programmed by routing engine 84 to store I-SID table 410, which forwarding engine 86 utilizes when processing packets to associate a customer MAC address with a provider service instance of a packet frame. In other words, the I-SID defines the service instance that the packet frame is mapped to. The I-SID table 410 may include pairs of C-MAC address and B-MAC addresses. For example, entry 413 of the I-SID table 410 may include a C-MAC address of CE device 8A (411) and the associated B-MAC address of B-MAC1 (412). PE device 6A' may utilize the I-SID table 410 to map and associate a packet accordingly.

FIG. 4C illustrates an example B-MAC table 420 maintained by a forwarding engine of a PE device, such as PE device 6A'. For example, forwarding engine 86 may be programmed by routing engine 84 to store B-MAC table 420, which includes entries for Ethernet segment identifier (ESI) values, B-MAC addresses, and VPNs. For instance, entry 424 may include an ESI value 421. In one example, ESI value 421 is a unique identifier of Ethernet segment 13A, such as a non-zero ESI value to represent a multi-homed connection and/or a zero ESI value to represent a single-homed connection. In such case, PE device 6A' may include a separate data structure that includes ESI value 421 associated with a list that includes identifiers of PE devices included in Ethernet segment 13A. In another example, ESI value 421 is a pointer or reference to a list of identifiers of PE devices included in Ethernet segment 13A. The identifiers of the PE devices included in Ethernet segment 13A may include IP addresses, MAC addresses, MPLS labels advertised by the respective PE devices, or any other suitable identifier for identifying a PE device. Entry 424 may also include B-MAC1 423, which is a B-MAC address associated with Ethernet segment 13A. Because B-MAC1 is included in the same entry 424 as ESI value 421, B-MAC1 is associated with PE devices included in Ethernet segment 13A, and more generally, associated with Ethernet segment 13A. Entry 424 may further include a Router Target 422 to maintain the uniqueness among identical routes.

In one example, in accordance with techniques of the disclosure, PE device 6A may inject BUM traffic 11, which may take the form of PBB-EVPN Packet 400, into PBB-EVPN 23. PE device 6A' receives the BUM traffic 11 from PE device 6A via a core-facing interface 24, such as one of IFCs 88. Forwarding engine 86 of PE device 6A' may perform a lookup operation to determine the next hop. PE device 6A' may identify keys 70 associated with the received BUM traffic 11. PE device 6A' may perform lookup operations based on the identified keys 70, such as a lookup of a B-MAC route table 420 and an I-SID table 410. For example, a lookup of the B-MAC route table 420 enables PE device 6A' to determine that entry 424 includes B-MAC1. PE device 6A' may further determine that B-MAC1 is associated with Ethernet segment 13A from the aliasing data between B-MAC1 and an identifier of Ethernet segment 13A. PE device 6A' may then perform a lookup on the customer bridge domain (C-BD) to determine the C-MAC address associated with the B-MAC1 address. For example, PE device 6A' may lookup I-SID table 410 to determine from entry 413 that the B-MAC1 address is associated with a particular C-MAC address of CE device 8A.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
receiving, by a first provider edge (PE) device and from a second PE device that implement a provider backbone bridging Ethernet Virtual Private Network (PBB-EVPN), a packet via a core-facing interface of the first PE device, wherein the first and second PE devices are coupled to a multi-homed customer edge (CE) device by an Ethernet segment, and wherein the first PE device has been elected a designated forwarder for forwarding packets from the PBB-EVPN to the CE device over the Ethernet segment;

determining, by the first PE device, that the received packet was previously received on a local interface associated with the Ethernet segment of the second PE device and forwarded into the PBB-EVPN by the second PE device;

in response to determining that the received packet was previously received on the local interface associated with the Ethernet segment of the second PE device and forwarded into the PBB-EVPN by the second PE device, assigning a local interface of the first PE router associated with the Ethernet segment as an ingress interface that received the packet instead of the core-facing interface of the first PE device on which the packet was actually received from the PBB-EVPN; and applying split-horizon forwarding, based on the assigned ingress interface, to process the received packet without forwarding the received packet out the local interface to the Ethernet segment coupling the first PE device to the CE device.

2. The method of claim 1, wherein determining that the received packet was previously received on the local interface associated with the Ethernet segment of the second PE device and forwarded into the PBB-EVPN by the second PE device comprises performing a lookup operation based on one or more keys of the received packet to determine whether the keys map the received packet from the local interface of the second PE device to the local interface of the first PE device.

3. The method of claim 2,
wherein the first PE device and the second PE device are assigned a common bridge media access control (B-MAC) address, and
wherein the one or more keys of the received packet comprises a source B-MAC address for the packet and at least one of a service identifier (I-SID), a customer virtual local area network (C-VLAN), and a service virtual local area network (S-VLAN).

4. The method of claim 3, wherein determining that the received packet was previously received on the local interface associated with the Ethernet segment of the second PE device and forwarded into the PBB-EVPN by the second PE device comprises comparing the source B-MAC address of the received packet with the common B-MAC address assigned to the first PE device, wherein a match of B-MAC addresses indicates the received packet was previously received on the local interface associated with the Ethernet segment of the second PE device and forwarded into the PBB-EVPN by the second PE device.

5. The method of claim 1, wherein assigning the local interface of the first PE router associated with the Ethernet segment as the ingress interface of the received packet instead of the core-facing interface of the first PE device on which the packet was received from the PBB-EVPN comprises updating a media access control (MAC) table of the first PE device to identify a source customer MAC address of the received packet as reachable through the local interface associated with the Ethernet segment of the first PE device.

6. The method of claim 1, wherein applying the split-horizon forwarding to process the received packet without forwarding the received packet out the local interface to the Ethernet segment coupling the first PE device to the CE device comprises forwarding the received packet to a different CE device coupled to the first PE device by a link other than the Ethernet segment.

7. The method of claim 6, further comprising:
receiving, by the first PE device, return traffic from the different CE device coupled to the first PE device by the link other than the Ethernet segment; and
forwarding the return traffic out the local interface to the Ethernet segment coupling the first PE device to the CE device without forwarding the return traffic to the PBB-EVPN.

8. The method of claim 1, wherein applying the split-horizon forwarding to process the received packet without forwarding the received packet out the local interface to the Ethernet segment coupling the first PE device to the CE device comprises dropping the received packet to prevent forwarding the received packet out the local interface to the Ethernet segment coupling the first PE device to the CE device.

9. A provider edge (PE) device comprising:
a routing component having at least one processor coupled to a memory, wherein the routing component executes software configured to establish a provider backbone bridging Ethernet Virtual Private Network (PBB-EVPN) with one or more other PE devices;
a core-facing interface to receive packets from the PBB-EVPN;
a local interface that connects the PE device to a customer edge (CE) device by an Ethernet segment, wherein the CE device is multi-homed to a second one of the PE devices by the Ethernet segment, and wherein the PE device has been elected a designated forwarder for forwarding packets from the PBB-EVPN to the CE device over the Ethernet segment;
a forwarding component configured to:
responsive to determining that a packet received from the core-facing interface was previously received from the CE device by the second PE device over the Ethernet segment and forwarded into the PBB-EVPN by the second PE device, assign a local interface of the PE device associated with the Ethernet segment as an ingress interface that received the packet instead of the core-facing interface of the PE device on which the packet was actually received from the PBB-EVPN; and
apply split-horizon forwarding, based on the assigned ingress interface, to process the received packet without forwarding the received packet out the local interface to the Ethernet segment coupling the PE device to the CE device.

10. The device of claim 9, wherein the forwarding component is configured to determine that the received packet was forwarded into the PBB-EVPN by the second PE device by performing a lookup operation based on one or more keys of the received packet to determine whether the keys map to the local interface of the PE device.

11. The device of claim 9,
wherein the PE device and the second PE device are assigned a common bridge media access control (B-MAC) address, and
wherein the one or more keys of the received packet comprises a source B-MAC address for the packet and at least one of a service identifier (I-SID), a customer virtual local area network (C-VLAN), and a service virtual local area network (S-VLAN).

12. The device of claim 9, wherein the forwarding component is configured to compare the source B-MAC address of the received packet with the common B-MAC address assigned to the PE device, wherein a match of B-MAC addresses indicates the received packet was previously received on the local interface associated with the Ethernet segment of the second PE device and forwarded into the PBB-EVPN by the second PE device.

13. The device of claim 9, wherein the forwarding component is configured to update a media access control (MAC) table to identify a source customer MAC address of the received packet as reachable through the local interface associated with the Ethernet segment of the first PE device.

14. The device of claim 9, wherein the forwarding component is configured to forward the received packet to a different CE device coupled to the first PE device by a link other than the Ethernet segment.

15. The device of claim 14, wherein the forwarding component is further configured to:
  receive return traffic from the different CE device coupled to the first PE device by the link other than the Ethernet segment; and
  forward the return traffic out the local interface to the Ethernet segment coupling the first PE device to the CE device without forwarding the return traffic to the PBB-EVPN.

16. The device of claim 9, wherein the forwarding component is configured to drop the received packet to prevent forwarding the received packet out the local interface to the Ethernet segment coupling the first PE device to the CE device.

* * * * *